(No Model.)
J. F. WALTER, Jr.
CARRIAGE HUB AND AXLE.
No. 304,877. Patented Sept. 9, 1884.
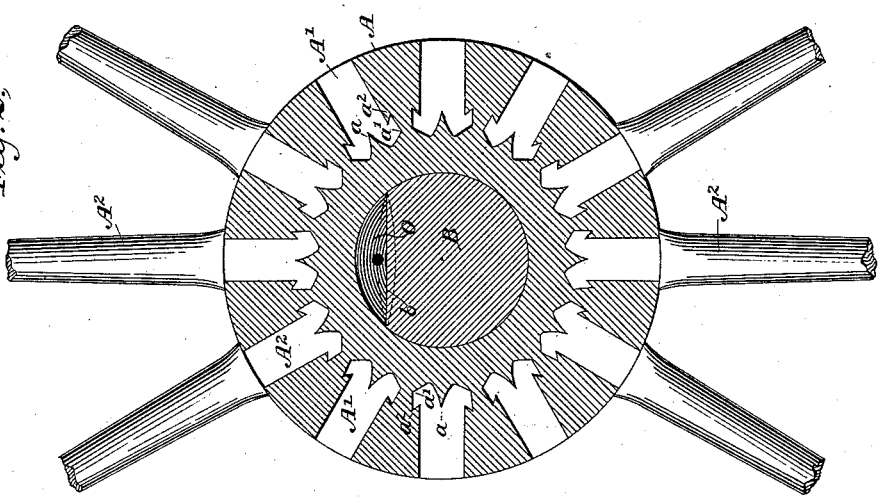
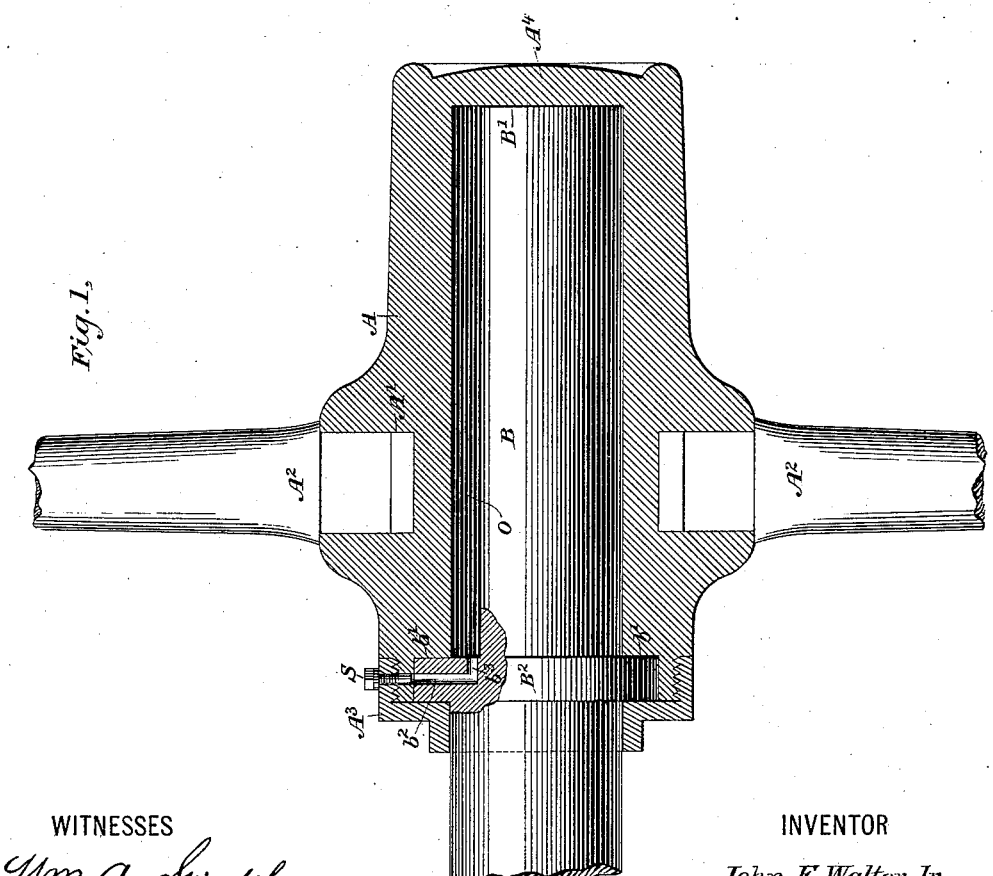
WITNESSES
Wm A. Skinkle
Carrie E. Ashley
INVENTOR
John F. Walter, Jr.
By his Attorneys
Pope Edgecomb & Butler

UNITED STATES PATENT OFFICE.

JOHN F. WALTER, JR., OF BROOKLYN, NEW YORK.

CARRIAGE HUB AND AXLE.

SPECIFICATION forming part of Letters Patent No. 304,877, dated September 9, 1884.

Application filed December 29, 1883. (No model.)

*To all whom it may concern:*

Be it known that I, JOHN F. WALTER, Jr., a citizen of the United States, and a resident of Brooklyn, in the county of Kings and State of New York, have invented certain new and useful Improvements in Carriage Wheels and Axles, of which the following is a specification.

My invention relates to that class of wheels in which the hub is made of cast or malleable iron or some similar metal, while the spokes are made of wood and the axle of iron or steel.

The object of my invention is to provide means for fastening the spokes more securely in the hub than has been done heretofore, and also to provide an improved form of axle, whereby the lubrication is made more certain, while the construction is such that either fluid or solid lubricants may be used.

My invention consists in enlarging the lower end of the aperture formed in the hub for the reception of the spoke, and in forming the bottom of said aperture in the shape of a wedge, so that when the spoke is driven into its place it is made to fill the enlarged lower part of the aperture, and is forced into connection with certain hooks formed in the hub, which hold it securely, so that it cannot become loose or be drawn out; and it also consists in making the upper part of the axle approximately flat, thus leaving an open space between the upper part of the axle and the bore of the hub, wherein a larger quantity of lubricating material may be placed than is the case with ordinary wheels, and providing also for the use of solid lubricants, if desired.

In the accompanying drawings, which illustrate my invention, Figure 1 is a transverse longitudinal section, and Fig. 2 a vertical section, of a hub and axle with some of the spokes in place.

In the drawings, A is the hub, preferably of cast or malleable iron. A' represents the openings for the spokes, and $A^2$ the spokes. B is the axle. $B^2$ is a cylindrical enlargement of the same, fitting the inner end of the hub, and O the opening of lenticular cross-section, formed by cutting away a portion from the top of the axle inside the hub. The pattern for the hub is made in such a manner that when cast the bottoms of the spoke-holes have wedge-shaped projections, as shown at $a$, with the edge pointing outward. The holes are also enlarged laterally at the bottom, (shown at $a'$,) and made on each side in the shape of a barb, as shown at $a^2$. The spokes therefore, the ends of which have preferably been steamed previously to driving, when driven home, are split by the wedges, and the wood is forced into the lateral enlargements, whereby the spoke is held in the firmest manner, and cannot be made loose by any of the ordinary causes which affect wheels of this kind. Before driving the spokes the hub is preferably heated so as to expand it somewhat, and its subsequent shrinking upon becoming cool more firmly binds the spokes. The hub A has a cylindrical or slightly conical bore. I prefer not to have the bore extend entirely through the hub, but to have the end of the latter left solid, as shown at $A^4$. The axle B is turned to accurately fit the bore, and the end B' is also turned to fit and bear against the bottom of the bore. The cylindrical enlargement $B^2$ of the axle is turned to fit a corresponding recess turned in the inner end of the hub. From the enlargement $B^2$ of the axle to the end—that is, throughout that part of that axle which has its bearing in the hub—the top is cut off, leaving the space O above the axle and between it and the bore of the hub. This space may be filled with oil; or, if desired, a more solid lubricant—such as tallow or plumbago—may be used, with the certainty that the bearing will be supplied as long as any remains. The surface of the upper side of the axle thus cut away may be slightly convex or concave, as shown by the dotted lines above and below the line $b$, Fig. 2. When the axle is put into the hub, the collar $A^3$ is secured to the outside of the hub, bearing against the enlargement $B^2$ and pressing the latter so that it bears against the inner side of the recess at $b'$. In the enlargement $B^2$, on its upper side, being on the same side of the axle from which a portion has been cut away, the hole $b^2$ is bored, and a corresponding hole is bored through the collar $A^3$ and the intervening portion of the hub. A hole, $b^3$, from the space O is bored, meeting the first-named hole at right angles. Oil may be thus introduced into the space O. The screw S is screwed through the collar $A^3$ and into the hub, thus closing the hole outside of the axle and preventing the collar from turning and becoming loose.

I am aware that a narrow groove has been cut along the top of the axle inside the box or hub; but such groove does not afford means of lubricating with solid substance, nor does it lubricate with certainty, even when oil is used.

I am also aware that axles have been made with a portion of the spindle or bearing part of the axle flattened, in combination with a groove along a portion of the spindle; but the same objection applies—solid lubricants cannot be used. These require a reservoir extending the whole length of the bearing.

I claim as my invention—

1. A metal carriage-hub having wedge-shaped projections in the bottoms of the spoke-holes, formed in a radial line from the center of the hub, and with the said bottoms of the spoke-holes enlarged laterally, the sides of said enlargements formed into barbs or hooks, so that the spoke, when driven, is split by the wedges and forced into said enlargements and into engagement with said barbs, substantially as described.

2. The metal hub A, having the spoke-holes A', with the enlargements $a'$, the wedge-shaped projections $a$, and the hooks or barbs $a^2$, substantially as described.

3. The combination of the hub A and the spokes $A^2$, the latter held in place by means of the wedge $a$ and the barbs $a^2$, substantially as described.

4. A carriage-axle having a portion of that part upon which the hub turns cut away throughout its entire length, thereby forming a space having a lenticular cross-section between the said axle and the surface of the bore of the hub.

In testimony whereof I have hereunto subscribed my name this 28th day of December, A. D. 1883.

JOHN F. WALTER, JR.

Witnesses:
 DANL. W. EDGECOMB,
 CARRIE E. DAVIDSON.